United States Patent Office 2,694,713
Patented Nov. 16, 1954

2,694,713

FAST BASES OF THE ACRIDONE SERIES

Frederick Brody, New York, N. Y., assignor to American Cyanamid Company, New York, N. Y., a corporation of Maine No Drawing. Application March 1, 1952,
Serial No. 274,487

3 Claims. (Cl. 260—279)

The present invention relates to compounds of the formula:

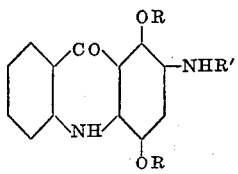

in which R' is selected from the group consisting of hydrogen and $R_2CO$ and R and $R_2$ are lower alkyl.

In the past, it has been difficult to obtain stable azo dyes and pigments of a greenish-blue shade. The compounds of the present invention in the form of their free bases, that is to say, where R' is hydrogen, can be diazotized and then coupled with a wide variety of coupling components. When they are coupled with arylides of 2-hydroxynaphthoic acid, azo coloring matters are obtained having good fastness properties and an unusual greenish shade of blue. The utility of the compounds of the present invention is, however, not limited to the production of blue azo coloring matters, since other shades may be obtained with different coupling components.

In general, the compounds of the present invention are not limited to any particular method of preparation. However, it has been found that 2-bromobenzoic acid can readily be condensed with 2,5-dialkoxy-4-aminoacyl anilides in the presence of powdered copper and iodine to form the corresponding substituted diphenylamine-o-carboxylic acids, which can then be readily cyclized to the corresponding acridone by treatment with phosphorus pentachloride, followed by stannic chloride. This process operates smoothly and effectively and constitutes the preferred method by which the compounds of the present invention may be prepared. In the process, the acylamino acridones are first formed, that is to say, where R' is acyl and can then easily be hydrolyzed to the free amino compounds, which is the form in which the products of the present invention are primarily used. The hydrolysis is by conventional means. While the particular acyl group is not important and can be a typical fatty acid acyl group, such as acetyl, propionyl, formyl, etc., the acetyl group is so much more readily available and cheaper that it is the only one which is used in practical industrial production and, therefore, constitutes the preferred form. However, the invention is not limited to the production of this particular acyl compound.

The alkoxy group may be methoxy, ethoxy, propoxy, etc., but the best and most useful coloring matter is obtained from the methoxy compound, which constitutes the preferred embodiment. The invention, however, is not limited thereto in its broader aspects.

It is an advantage of the present invention that the amino acridones can be diazotized by ordinary methods and require no special procedures. Also, these diazo compounds may be used in the various common ways for preparing azoic coloring matters. Thus, for example, they may be coupled with coupling components, particularly ice color components, to form dyestuffs or pigments, or the coupling component can be padded on cloth and the coloring matter developed in the fiber. It is also possible to transform the diazo compounds into the diazoamino and other stable derivatives, so that they may be incorporated into a printing paste, the color being developed on the goods by acid development in the usual manner.

Among the ice color coupling components which are particularly suitable for use in coupling with the diazotized compounds of the present invention are the following: beta-naphthol, 8-amino-2-naphthol, 8-acetylamino-2-naphthol, benzyl naphthols, pyrazolones and pyrazyl pyrazolones, hydroxybenzofluorenones; and the various N-substituted amides such as arylides of 2-hydroxy-3-naphthoic acid, of 2-hydroxy-3-anthroic acid, of methyl and dimethyl-salicylic acids, of hydroxybenzacridone carboxylic acids, of hydroxydibenzofuran carboxylic acids, of hydroxybenzothiophene carboxylic acids, of acetoacetic acid, of benzoylacetic acid and the like.

This invention is further illustrated by the following examples. Where not otherwise noted, parts are by weight.

*Example 1*

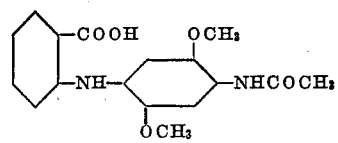

A mixture of 6.3 parts of 2,5-dimethoxy-4-aminoacetanilide, 6.03 parts of 2-bromobenzoic acid, 6.2 parts of anhydrous potassium carbonate, 0.05 part of copper powder, 0.05 part of iodine and 40 parts of amyl alcohol is refluxed until condensation is complete. The solvent is removed by steam distillation and the residual, black product recrystallized from a mixture of dioxane and water.

*Example 2*

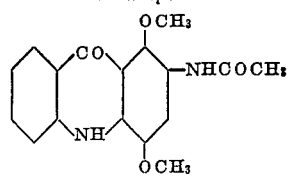

A mixture of 4.9 parts of the product of Example 1 with 3.5 parts of phosphorus pentachloride in 35 parts of benzene is shaken at room temperature while there is gradually added an additional 3 parts of phosphorus pentachloride, the temperature being raised to reflux during the latter part of this operation. The mixture is then thoroughly cooled and there is added gradually to it 9 parts of stannic chloride, followed after an interval by ice and concentrated hydrochloric acid. The resulting product is filtered and recrystallized from aqueous alcohol.

*Example 3*

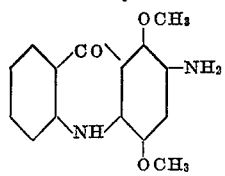

Hydrolysis of the product of Example 2 is readily carried out by refluxing in a solution prepared from 5 parts of potassium hydroxide, 4 parts of water and 16 parts of alcohol. The product is isolated by drowning and filtration and may be recrystallized from butanol.

*Example 4*

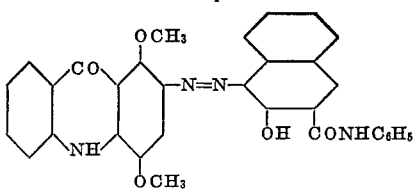

The above blue dyestuff is obtained by diazotizing the product of Example 3 in the ordinary way with nitrite and acid and developing in the diazo solution a length of cotton cloth padded with an alkaline solution of 2-hydroxy-3-naphthoic anilide.

Example 5

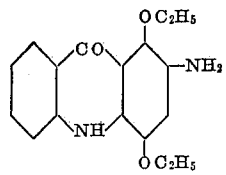

The procedure of Examples 1–3 are followed, substituting 2,5-diethoxy-4-aminoacetanilide for the 2,5-dimethoxy-4-aminoacetanilide in Example 1. The resulting diethoxy acridone compound is obtained in good yield and can be used in the same manner as the product of Example 3. For instance, it may be diazotized and coupled with 2-hydroxy-3-naphthoic anilide to produce a blue dyestuff, differing only slightly in shade from the product of Example 4.

I claim:
1. A compound of the formula

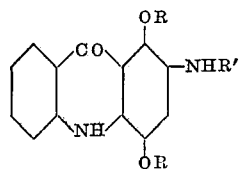

in which R' is selected from the group consisting of H and $R_2CO$ and R and $R_2$ are lower alkyl.

2. A compound of the formula

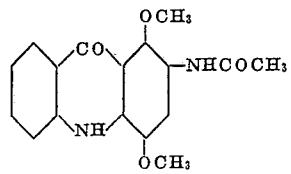

3. A compound of the formula

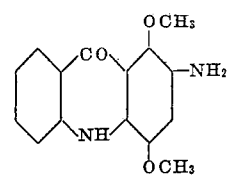

References Cited in the file of this patent
UNITED STATES PATENTS

| Number | Name | Date |
|---|---|---|
| 2,156,731 | Lange et al. | May 2, 1939 |
| 2,493,191 | Goldberg et al. | Jan. 3, 1950 |
| 2,647,901 | Archer | Aug. 4, 1953 |